United States Patent [19]

Frazee et al.

[11] Patent Number: 5,150,427
[45] Date of Patent: Sep. 22, 1992

[54] THREE DIMENSIONAL DISARTICULATION

[75] Inventors: David M. Frazee, Waukesha; Carl R. Crawford, Milwaukee, both of Wis.

[73] Assignee: General Electric Company, Milwaukee, Wis.

[21] Appl. No.: 414,377

[22] Filed: Sep. 29, 1989

[51] Int. Cl.⁵ .............................................. G06K 9/36
[52] U.S. Cl. ......................................... 382/48; 382/6; 382/57; 358/453; 364/413.16; 364/413.19
[58] Field of Search .............. 382/48, 57, 6; 358/453, 358/464; 340/721, 734; 364/522, 413.14, 413.16, 413.19, 413.22

[56] References Cited

U.S. PATENT DOCUMENTS

| | | | |
|---|---|---|---|
| 4,751,643 | 6/1988 | Lorensen et al. | 364/414 |
| 4,791,567 | 12/1988 | Cline et al. | 364/413.13 |
| 4,852,024 | 7/1989 | Kurakake et al. | 364/521 |
| 4,868,748 | 9/1989 | Crawford | 364/413.22 |
| 4,943,801 | 7/1990 | Oguchi | 340/723 |
| 4,954,819 | 9/1990 | Watkins | 340/721 |

OTHER PUBLICATIONS

"3-D Imaging Using Normalized Gradient Shading in CT and MRI", Carl R. Crawford, SPIE, vol. 1091, Medical Imaging III: Image Capture and Display (1989).

*Primary Examiner*—Leo H. Boudreau
*Assistant Examiner*—Steven P. Klocinski
*Attorney, Agent, or Firm*—Quarles & Brady

[57] ABSTRACT

A method of editing image data produced from reconstructed tomographic data comprises the creation and editing of a bit map with bits corresponding to each data element of the image. The bit map permits faster processing of editing commands. The resultant image is displayed from a boolean combination of the edited bit map and the original data elements. Rapid altering of the boolean combination allows "toggling" of the edited image with an unedited image for clarity. The edited bit map may be used to edit a three dimensional reconstruction by substituting pad values for the image data according to the state of the bit map. The bit map may be altered to track certain editing processes such as connectivity or region growing.

3 Claims, 2 Drawing Sheets

THREE DIMENSIONAL DISARTICULATION

BACKGROUND OF THE INVENTION

This invention relates to the display of tomographic data and more specifically to a method of editing tomographic images in preparation for generating surfaces.

Tomographic data is collected by a wide variety of medical imaging equipment including equipment used for x-ray computed tomography (CT), nuclear magnetic resonance imaging (MR), single photon emission tomography, positron emission tomography, or ultrasound tomography. Tomographic data may be used to construct cross-sectional images of a body, such images being used extensively, for example, in medical diagnosis.

A "projection set" of tomographic data may be reconstructed to produce a single cross sectional image or "slice" image comprised of a matrix of picture elements ("pixels") with each pixel corresponding to a volume element ("voxel") within the imaged body along the slice plane. The pixels of each slice image are stored as digital numbers representing the computed signal intensity at their corresponding voxels. For example, a slice image may be comprised of an array of 512 by 512 pixels each corresponding to one of the 262,144 voxels within the slice of the imaged body.

A typical tomographic imaging study will involve the acquisition of a number of projection sets to produce images of a series of contiguous slices displaced incrementally along an axis. This series of contiguous slice images provides a third spatial dimension of information about the imaged body and increases the amount of pixel data that must be stored and manipulated. A study of 64 contiguous slices may require the generation of over 16 million pixel data words.

A radiologist may visualize the third dimension of the imaged object by viewing the slice images in order of their position along the acquisition axis, or the numerical data of the reconstructed slice images may be viewed by computer programs which produce shaded perspective pictures of the imaged object in three dimensions. This latter approach is preferred for complex three dimensional structures where it is difficult or impossible to understand the three dimensional spatial relationships by reviewing contiguous slices.

Synthesizing a three dimensional image from tomographic data is a two-step process. In the first step, a mathematical description of the surface of the desired object is extracted from the tomographic data. In the second step, a shaded image is synthesized from the mathematical surface description.

Dealing with the second step first, it will be assumed that a surface description comprised of a large number of surface elements ("surfels") may be constructed. The surfels may be operated on by conventional computer graphics techniques, having its genesis in computer-aided design and computer-aided manufacturing, to apply surface shading to objects to aid in image interpretation through a synthesized two-dimensional image. In one such shading method, the surface shading is determined by the distance between the surfel and an imaginary observation point. In a second such method, the surface normal of the surfel, that is, the angle at which the surfel is tipped with respect to an imaginary observation point, determines the surface shading. Generally, the shading is lightest (i.e., most intense) for image elements having surface normals along an operator-selected line of sight and successively darker for those elements inclined to the line of sight. Image elements having surface normals inclined more than 90 degrees from the selected line of sight are hidden in a 3-D object and are suppressed from the display. Foreground objects on the line of sight hide background objects. The shading gives a realistic illusion of three dimensions. In a modified version of the above method, the surface normal is replaced with the gradient of the voxel associated with the surfel.

Returning now to the first step of synthesizing a three dimensional image, producing a mathematical description of the desired surface from the tomographic slice data requires two substeps: 1) the extraction of the object of interest from the rest of the tomographic data, and 2) the fitting of a surface to the extracted object.

The first substep, extraction of the object of interest from the the rest of the tomographic data, is typically performed by differentiating between tissue densities as reflected in the signal intensities associated with each voxel. For example, the signal intensity associated with bone, in an x-ray CT, is substantially different from the signal intensity associated with the surrounding softer tissue and may be used as a surface defining criterion. By establishing a suitable threshold, a simple comparison of the signal intensity of each voxel with the threshold readily distinguishes those voxels associated with the bone rather than the soft tissue.

The above thresholding method works very well when the voxels corresponding to an object-of-interest are the only ones in the tomographic data that fall within the particular thresholding range. This is true of bone in CT and blood vessels in MR, for example. However, many potential objects-of-interest within a body share a density range (or other identifying property) and hence cannot be distinguished by simple thresholding techniques. For example, in CT imaging, images of organs are not readily differentiated. It may be difficult to distinguish even high contrast objects such as bone from other bone-like objects such as the plaster of a cast or other obscuring bones.

In these cases, a method known as connectivity or region growing can be used to separate objects that cannot be distinguished by simple thresholding of signal intensity values. In using connectivity, only voxels connected to a user-identified seed voxel in the object-of-interest will be accepted during the surface extraction step. A voxel is connected to the seed if and only if (1) the voxel is a neighbor (i.e., adjacent to the seed, in a predefined direction) or a neighbor of another connected voxel, and (2) the voxel shares a specified property (e.g., falling within the same threshold range) with the seed voxel. Connectivity has been successfully used in generating three dimensional CT images of soft tissue structures such as the knee ligaments.

The success of such connectivity techniques is dependant on the placement of the seed voxel. A significant problem is "bridges" between the two objects to be separated. A bridge allows the connectivity to spread into the other object. Bridges in the third dimension of the object, where the connection is not visible within a single slice, are particularly hard to detect. Accordingly, for complex structures it may be necessary to try several seed placements before the desired object may be successfully connected. U.S. Pat. No. 4,903,202 issued Feb. 20, 1990 entitled: "Three-Dimensional Object Removal Via Connectivity" and U.S. Pat. No.

4,905,148 issued Feb. 27,1990, both assigned to the same assignee as that of the present invention, entitled "Three-Dimensional Surface Representation Using Connectivity Method Without Leaks", describe the identification and avoidance of such bridges.

In the second substep of producing a mathematical description of the surface of interest, the boundary between the voxels of the object and any non-object voxels must be determined. This determination may be made by using the marching cubes, dividing cubes, or cuberille methods, as are known in the art. The dividing cubes method is described in U.S. Pat. No. 4,719,585, issued to Cline et al. on Jan. 12, 1988, which is incorporated by reference.

In the dividing cubes method, each set of eight cubically adjacent pixels corresponding to voxels in the contiguous slices are examined. The pixels define the vertices of a cube. Each large cube formed in this manner is tested to determine whether the object boundary passes through it. One way to perform this test is to compare the intensity value at each vertex of the cube with the threshold value used to define the object during the extraction step. If some densities are greater and some less than the threshold (or some within the range and some not), then the surface passes through the large cube. In that event the cube is subdivided to form a number of smaller cubes, referred to as subcubes or subvoxels. Densities are calculated by interpolation for the subcube vertices. If the surface passes through a subcube, then the location and the normalized gradient of its vertices, calculated at the center of the subcube, is output to produce a shaded image as described above.

The above techniques of producing a three dimensional image are computationally demanding. Not only is the amount of tomographic data that must be manipulated large, but the steps of extracting the object, generating its surface, and shading the surface require complex repeated operation on the pixel data. For this reason, high speed array processors are often employed for such image generation. Even so, the calculation of a three dimensional image for a 63 slice tomographic series may take on the order of five minutes.

Often the image data is edited by the radiologist prior to three dimensional image generation. Such editing may consist of applying the connectivity methods described above to the image data, to extract a feature of interest, or applying manual editing techniques such as cursor tracing to define or extract a particular region of interest. The time required to reprocess the edited image may add significantly to the time required for three dimensional image generation. If the reprocessing time required by the editing becomes too great, it limits the usefulness of the editing process.

A radiologist may also wish to store several versions of an edited image for future reference, along with an unedited copy of the tomographic data to ensure data integrity. Alternatively, if the memory word size is larger than necessary to store the pixel data, a fixed quantity may be added to the pixels of the unedited image to identify edited bits and yet allow the original data to be reconstructed without storing a separate copy of the original data. In either case considerable data must be stored for each edited image. The storage of several such images places severe demands on the storage medium associated with the imaging device. The time required to load and store such data also adversely affects the speed of the editing process.

SUMMARY OF THE INVENTION

The invention provides a method of editing tomographic images. Each pixel of the image is first associated with a bit in a bit map and editing is performed on the bit map rather than on the pixel data itself. A displayed edited image is produced from the boolean combination of the bit map bits with their corresponding pixels.

It is one object of the invention to increase the speed with which the editing process may be performed. Manipulation of bits in a bit map is up to sixteen times faster than manipulation of the 16-bit pixel data. Editing the bit map rather than the pixel data allows the use of the faster binary test instructions in the processor. Improving the speed of the editing process allows additional edited image views to be produced, improving the imaging equipment's value as a diagnostic tool. For future imaging devices with potentially longer pixel data words or even different data types, manipulation of bit maps separates the editing process from the pixel data format, improving the portability of the editing routines.

The bit map is initialized by examining each pixel in the image set to see if it is part of the object of interest by means of an object selecting criterion or according to a predetermined initialization pattern. Subsequent editing is performed on copies of this bit map thus eliminating the need to repeat the thresholding process and further improving the speed of the editing process.

It is another object of the invention to reduce the amount of digital storage, principally computer memory and magnetic media, required to hold edited images, while preserving data integrity. The edited bit map and the image data are combined to produce edited image data by a simple and fast combining operation. Only the edited bit map therefore and the unedited image data need be stored. Multiple edited images require only the storage of additional bit maps. If each pixel of the image data comprises 16-bits, then storing the bit maps rather than the edited pixel data reduces storage requirements by a factor of 16. Again this improvement may be greater for future generations of imaging equipment with longer pixel data words. Editing of the bit map rather than the original image data also ensures that the integrity of the image data is not degraded with repeated editing sessions.

A three dimensional image may be generated from the bit maps and the original image data. If the bit of the bit map is "zero" and the pixel meets threshold requirements, then the three dimensional image generator operates on a pad value rather than that pixel. But if the bit of the bit map is "zero" and the pixel does not meet the threshold requirements, then the three dimensional image operates on the pixel of the original image data.

It is thus another object of the invention to permit a three dimensional image to be produced from a subset of the data meeting the surface defining criterion without eliminating data required to perform surface generation and shading. The only pixel values in the edited image set that are set to a pad value are those both meeting the threshold requirement and eliminated in the editing process. The data necessary to compute the surface gradients is thus preserved.

The various image editing functions are performed directly on the bit map. For connectivity editing it is necessary to determine not only the pixels that are neighbors to the seed pixel but also which pixels have been previously examined for connectivity. If this latter step is not performed, the connectivity program will proceed without termination. The bit map may be used to both remove the connected bits and tally those bits that have been previously examined. As only the set bits in the bit map can be connected, once each bit is tested it is set to zero indicating that it need not be tested again.

Thus it is another object of the invention to permit simplified connectivity editing. The remaining bit map after each examined bit has been set to zero may be used to remove the portion of the image connected to the seed pixel. If it is desired to retain the connected pixels rather than remove them, the edited bit map may be combined by an EXCLUSIVE OR operation with the unedited bit map.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
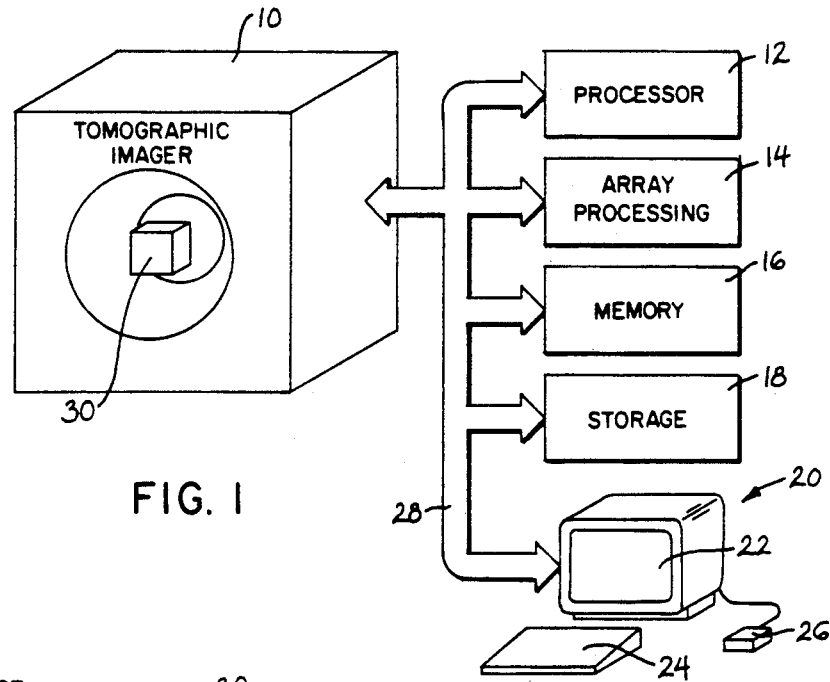
FIG. 1 is a block diagram of a tomographic imaging system suitable for practice of the present invention.

Referring to FIG. 1, an imaged object 30 is held within the bore of a tomographic imager 10, such as an x-ray computed tomography machine. The tomographic imager 10 collects tomographic data from the imaged object and transmits that data along high speed bus 28 for storage in memory 16 as is understood in the art. Also connected to bus 28 is a processor 12 which controls the operation of the tomographic imager and supervises the acquisition of data as is understood in the art. The processor 12 is a general purpose minicomputer such as the Data General Eclipse MV/7800C and may be programmed to perform the functions of the present invention as will be described below.

The processor 12 communicates with an array processor 14 also attached to bus 28, the latter for performing rapid processing of many data elements as is necessary for tomographic image reconstruction. The array processor is manufactured by Star Technologies of Virginia. Both the processor 12 and the array processor 16 may directly access the memory 16 which comprises thirty-two million bytes.

The amount of data required to represent each tomographic image is quite large and hence additional storage 18 is also provided in the form of disk drives and magnetic tape units. As is understood in the art, such storage units 18 have large data capacity but are considerably slower than memory 16 and hence, as a practical matter, any image data to be processed must first be loaded from the storage units 18 to the memory 16.

A workstation 20 is also attached to the bus 28 to permit the entry of programs and program parameters for use by the processor 12. The workstation 20 includes a high resolution video display tube 22, a keyboard 24 and a cursor control device 26 such as a trackball or a "mouse". The workstation 20 allows the display of the reconstructed tomographic images and permits the entry of editing commands as required in the present invention.

Figure 2:
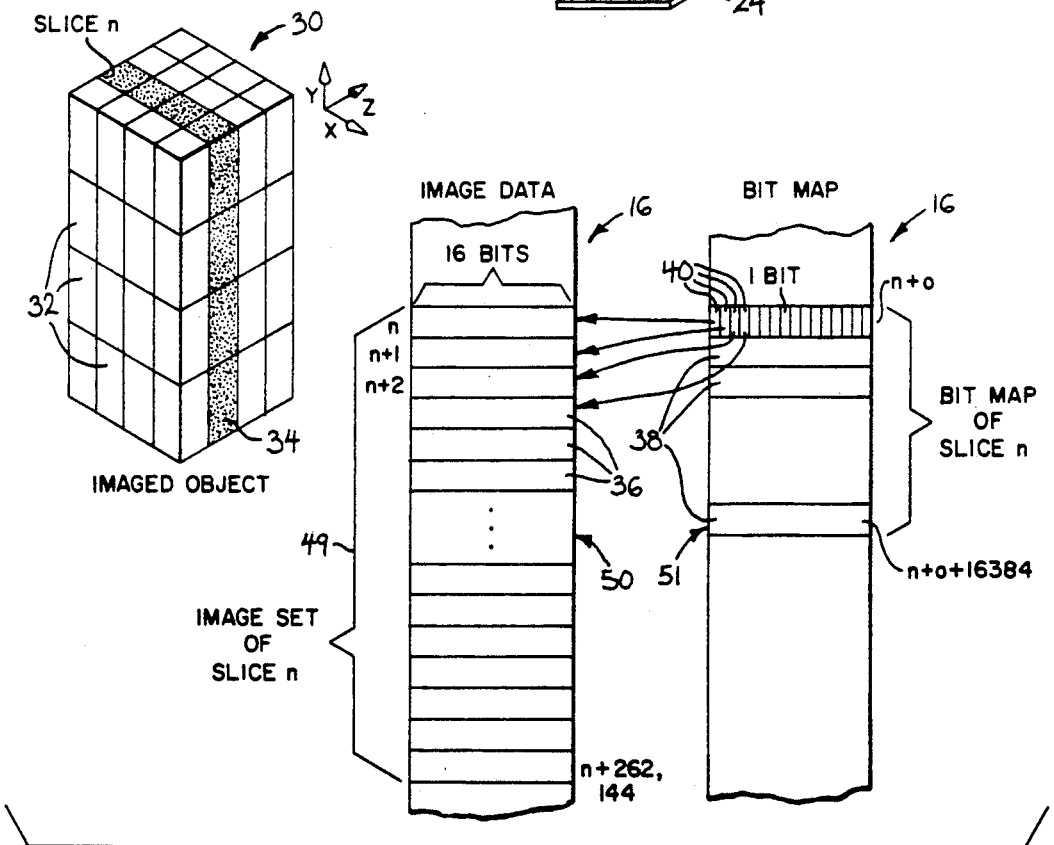
FIG. 2 is a schematic representation of the memory of the tomographic imaging system of FIG. 1 showing the relationship between the voxels of the imaged object, the corresponding pixel data and the construction of a corresponding bit map.

Referring to FIG. 2, the imaged object 30 may be conceptually divided into a plurality of adjacent regular voxels 32. The voxels forming a single plane are termed a slice 34 and the data used to form an image of each slice 34 comprises a tomographic projection set (not shown) referred to above. The projection set for each slice 34 may be reconstructed into an image set 49 of pixel data 36, the value of each pixel 36 describing a certain characteristic of its corresponding voxel 32. In the case of x-ray computed tomography, this characteristic is the voxel's relative opacity to x-ray radiation.

The pixel data 36 are stored in memory 16, each pixel as a 16-bit word and in an order reflecting its correspondence with the voxels 32 of the imaged object 30. A slice image may be displayed in two dimensions on workstation 20 by displaying the pixel data 36 as image intensities on the workstation display 20, with the pixels arranged according to the relative locations of their voxels 32 in the slice 34 of the imaged object.

As discussed above, it is frequently desired to edit the displayed image to remove certain structures. This is especially true in the case of a three dimensional display of the tomographic data where structure may block the object being examined. The editing of the images is not performed by operation on the image data 50 itself. Rather, a bit map 51 is first constructed.

The bit map 51 is also contained in memory 16 at an offset address o, removed from the image data 50 which exists simultaneously in the memory 16. The bits 40 of the bit map 51 are also contained in 16-bit words 38 per the architecture of the memory 16, but may be addressed separately within each word 38. The address of each bit 40 in the bit map 51 is mathematically related to the address of one 16-bit pixel 36 in the image data 50 so that the correspondence of a particular bit 40 and a particular pixel 36 may be readily determined. The address of a bit 40 of the bit map 51 may be determined from the address of the pixel 36 of image data 50 according to the following equations:

$$a_b = o + (a_p \backslash pl) \quad (1)$$

and $$\#_b = a_p - ((a_p \backslash pl)pl) \quad (2)$$

where:

$a_b$ and $a_p$ are the addresses of the bit 40 and pixel 36 in memory 16 respectively;

$\#_b$ is the bit number of the bit 40 within the word 38 at $a_b$; and $pl$ is the length of the pixel 36 in bits (16);

$\backslash$ is an integer division operation which differs from ordinary division in that the mantissa is truncated.

Clearly, the address of a pixel 36 associated with a particular bit 40 may also be determined by application of the inverse of the above equations (1) and (2). As is apparent from inspection of these equations, the bit map 51 occupies one sixteenth the area of memory 16 as does the image data 50 if the pixels 38 are each 16 bits. Further, multiple bit maps 51 may be created within memory 16 by the use of multiple values of offset o, each such value differing from the previous value by a number at least equal to the length of the bit map 51 so that there is no overlap of bit maps.

Figure 3:
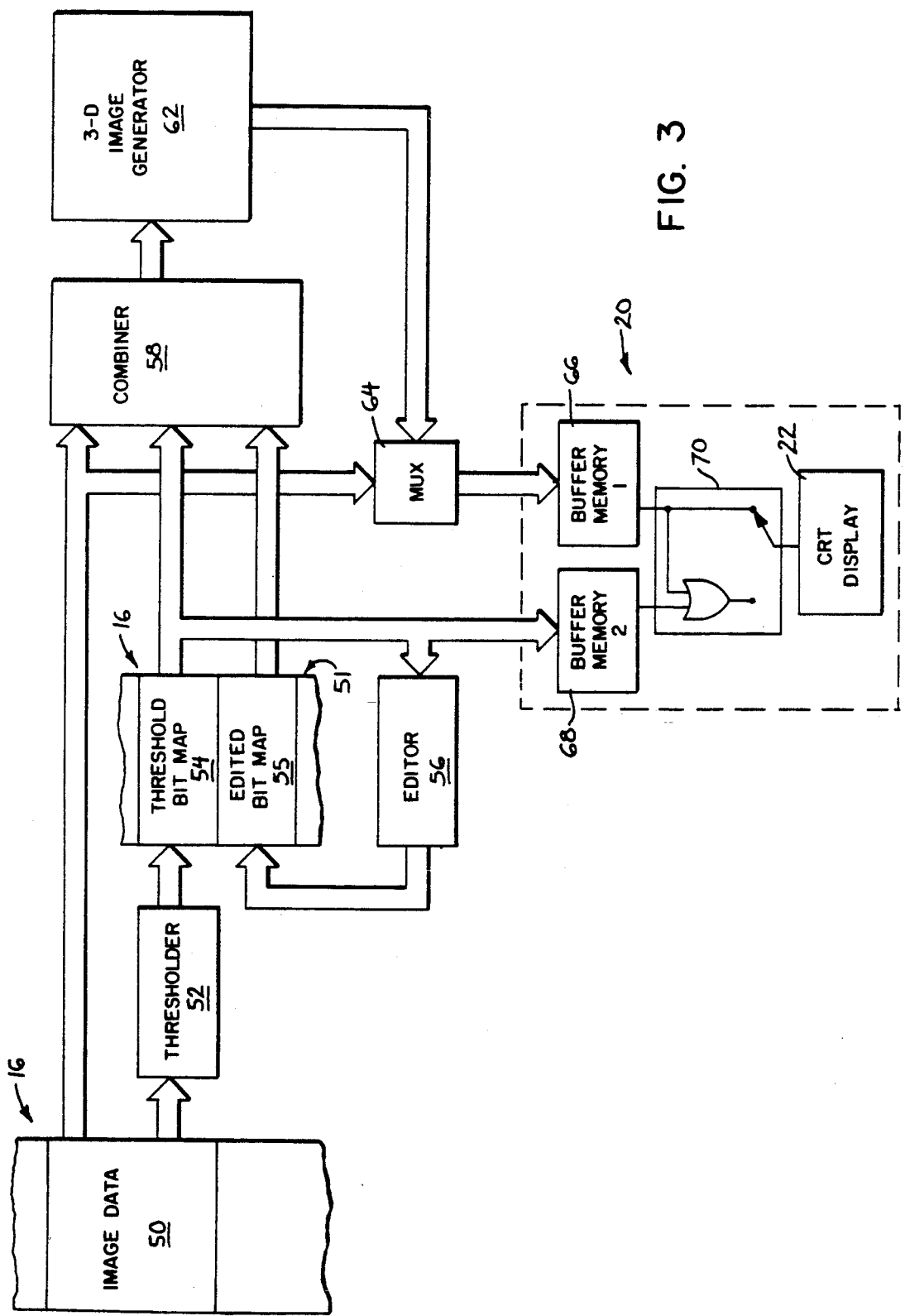
FIG. 3 is a block diagram of the editing system of the present invention.

The bits 40 of a threshold bit map 54 are initialized to "one" or "zero" based on the values of their corresponding pixels 36. Referring to FIG. 3, the threshold bit map 54 may be initialized by a thresholder 52 which is implemented through software run on processor 12 and array processor 14. The thresholder 52 examines each pixel 36 of the image data 50 and compares it to each of two threshold values, a high threshold $T_{high}$ and a low threshold $T_{low}$ which together establish a threshold range. These thresholds are selected by the radiologist based on an a priori knowledge of the intensity values of the object of interest as distinguished from the intensity values of the surrounding material. For example if the object of interest is bone, the thresholds will be set to capture pixels 36 with intensity values comparable to bone rather than soft tissue. If the pixel value $I_n$ is within the threshold range, that is $$T_{low} > I_n > T_{high} \tag{3}$$

then the corresponding bit 40 of the threshold bit map 54 is set to "one". Otherwise this bit is set to "zero". This threshold bit map 54 serves as a base for further editing of the image data 50 but is not modified unless the thresholding is to be changed.

The thresholder 52 may make use of object selection criteria other than the simple intensity thresholding of each pixel 36. As will be apparent to one skilled in the art, other image segmentation techniques may be applied to select the object. Many other thresholding systems exist; the particular object selection criterion will depend generally on the type of image and on the type of tomographic imaging device.

Alternatively, the threshold bit map 54 may be set to a predetermined pattern of "ones" or "zeros", essentially bypassing the thresholding process and providing a "blank slate" for the creation of subsequent edit bit maps 55.

In either case, edited bit maps 55 may be created by an editor 56 which reads the bits 40 from the threshold bit map 54 and writes a new edited bit map 55 with the editing results. The function of the editor is to force those bits of a bit map that are not of interest to zero. This edited bit map 55 may then serve as a starting point for creating additional edited bit maps 51 or may be changed itself by editing. The editor 56 is also realized by software operating on the processor 12 and array processor 14. In one embodiment, the edited bit map 55 is written over the threshold bit map 54, to save memory, and the threshold bit map 54, is recalculated when it is needed.

The general techniques of editing include connectivity methods as described above and manual editing by use of the cursor control device 26 of the workstation 20. In either case, the editing commands operate solely on a bit map 51.

With manual editing, the 16 bit image data 50 of a particular slice 34 of the imaged object 30 is truncated and offset to be loaded into a buffer memory 66 associated with the workstation 20 and thus to be displayed on the display tube 22. The portion of the edited bit map 55 corresponding to that slice 34 of image data 50 is loaded into a second 1-bit screen buffer 68. The displayed image on the display tube 22 is produced by either a direct reading of the first screen buffer 66 or by the logical combination of the corresponding words of the first screen buffer 66 with the bits of the 1-bit screen buffer 68 by means of a hardware boolean combiner 70. In the first case, the image data 50 is displayed unedited. In the second case, the image from the edited bit map 55 is superimposed with the image from the image data 50. With the images thus superimposed, the radiologist may move a screen cursor, with cursor control device 26, and carve away from the edited bit map 55 as desired.

In one embodiment, adding to the bit map 55 is not allowed. This reduces the possibility of the editing process inadvertently creating artificial structure in the images. Nevertheless, there are instances where the creation of additional structure is highly desirable, for example, during connectivity editing where such structure may be used to modify connectivity paths. Thus in another embodiment, the screen cursor may be used to add to the edited bit map 55 as well as subtract from the edited bit map 55.

Such editing operations are known in the art and performed by software operating on the processor 12 that monitors the cursor location and modifies the edited bit map 55 as required. The radiologist may control the boolean combiner 70 directly to permit the edited bit map 55 to be made invisible or visible in rapid sequence according to the radiologist's command, a process termed "toggling". Toggling helps the radiologist to see the result of his or her editing on a real-time basis prior to time consuming three dimensional image reconstruction. The interactive nature of the editing process places a premium on rapid processing of the editing commands. Such rapid processing is facilitated by the use of the edited bit maps 55.

The workstation 20 may also be used to display the result of connectivity editing. In particular, the workstation 20 allows the results of the connectivity process to be examined for "leaks" caused by bridge, again before the necessity of three dimensional image generation.

During the connectivity process, a seed pixel is identified by means of the cursor control device 26 on the workstation 20. The bit 40 of the edited bit map 55 associated with that seed pixel is identified and the connectivity methodology performed on the edited bit map 55. In the connectivity method, each set bit 40 in the edited bit map 55 adjacent to the seed bit ("first neighbors") is first identified. Whether a bit 40 is adjacent to the seed is determined by reference to the relative positions of the corresponding voxels 32 of those bits 40. These voxels 36 may be determined by associating the bits 40 to their corresponding pixels 36 by means of equations (1) and (2) above and identifying the voxels 32 by means of the known functional relation between the pixels 36 and the voxels 32.

The second neighbors to these first neighbors, that is, the set bits 40 of the edited bit map 55 adjacent to the first neighbors, are then identified and the first neighbors are set to zero. This setting of the first neighbors to zero is critical in that it prevents the connectivity methodology from continuing forever by tracing connections both backwards and forwards. When the connectivity process can find no more neighbors it ends, having produced a new edited bit map 55' (not shown) with certain portions removed.

If the portions removed were in fact obscuring structure, the editing may be complete. However, the removed structure may also be viewed separately, if it is the object of interest, by logically EXCLUSIVE ORing the edited bit map 55' with a copy of the original bit map 55 to produce a third edited bit map 55" (also not shown) with only those bits 40 that were removed by connectivity present in the third edited bit map 55". The editing process may be continued and many different bit maps may be created.

Each of these edited bit maps may be viewed on the workstation 20 to verify the correctness of the editing process and will be henceforth collectively referred to as edited bit maps 55. Only after the editing is complete need a three dimensional image generation be tried.

The three dimensional image generation produces two dimensional representations of a three dimensional shaded surface, as described above, from edited image data 59. The edited image data 59 is produced by combining the original image data 50 with the edited bit map 55 and the threshold bit map 54 by means of combiner 58 whose operation will now be described.

Combiner 58 is realized in software operating on processor 12 and array processor 14. The combiner 58 examines each bit 40 of the edited bit map 55 (ebm) and the threshold bit map 54 (tbm) and the corresponding pixel 32 of the image data 50 (id) and creates a corresponding word of edited image data 59 (eid) according to the following table:

|       | tbm = 1       | tbm = 0      |
|-------|---------------|--------------|
| ebm = 1 | eid = id      | not possible |
| ebm = 0 | eid = pad value | eid = id     |

The pad value does not satisfy the surface determining criterion used by the three dimensional image generator 62 to create the three dimensional image. The image data 50 passes unmodified to become the edited image data except if the corresponding bit 40 of the edited bit map 55 is zero and the corresponding bit 40 of the threshold bit map 54 is one. The three dimensional image generator 62 performs its own thresholding and hence if there has been no later editing of the threshold bit map 54, none of the image data 50 is changed.

The above process permits the gradients of the surfaces extracted by the three dimensional image generator 62 to be accurately calculated. The gradients require knowledge of both the intensity values of pixels 36 from voxels 32 within the object of interest and the voxels 32 neighboring the object of interest. The editing of the threshold bit map 54 to produce an edited bit map 55, however, requires that pad values replace pixels 36 so that the three dimensional image generator 62 does not generate a surface for the portions of the tomographic data removed by the editing process.

The edited image data 59 is processed by the three dimensional image processor 62 which is also realized in software executed by the processor 12 and the array processor 14 according to methods known in the art. Resultant two dimensional images of the calculated three dimensional surface may be loaded, by means of multiplexer 64, into the screen buffer 66 of the workstation 20 for display. Multiplexer 64 is also realized by software operating on the processor 12.

A preferred embodiment of the invention has been described, but it should be apparent to those skilled in the art that many variations can be made without departing from the spirit of the invention. For example, the editing of the bit maps may be done in any order and the new bit maps may replace the old bit maps to further conserve memory.

I claim:

1. A method of editing three-dimensional images formed of a plurality of image data words formed of first bits, each image data word associated with a voxel of a three dimensional imaged object comprising the steps of:

establishing a three dimensional bit map comprised of a plurality of second bits with each second bit identified to an image data word;

editing the three dimensional bit map;

producing from the plurality of image data words and the edited bit map, edited image data words corresponding to image words of the image object by:

a) setting a word of the edited image data to the value of its corresponding image word if its associated second bit in the bit map is not set and the value of its associated image word is outside of a predetermined range;

b) setting a word of the edited image data to a predetermined pad value if its associated second bit in the bit map is not set and its associated image word is within the predetermined range; and c) setting a word of the edited image data to the value of its corresponding image word if its associated second bit in the bit map is set and its associated image word is within the predetermined range extracting a surface from the edited image data; and displaying the extracted surface.

2. The method of claim 1 wherein the pad value does not satisfy a surface defining criterion used to extract a surface from the edited image data.

3. A method of displaying, on a display terminal, images formed of a plurality of image words, each image word associated with a voxel of an imaged object, the display terminal having a first and second display buffer memory for selectively displaying a Boolean combination of the data in the display buffer memories or the data of a single display buffer memory, comprising the steps of:

establishing a bit map of a plurality of bits distinct from the image words with each bit identified to an image word;

editing the bit map;

loading the bit map in the first display buffer memory as the data of the first display buffer memory;

loading the image words in the second display buffer memory as the data of the second display buffer memory; and toggling between displaying the Boolean combination of the first display buffer and the second display buffer and displaying the second display buffer only to provide a visualization of the image words identified by the bit map.

* * * * *